US006791693B2

(12) United States Patent
Hill

(10) Patent No.: US 6,791,693 B2
(45) Date of Patent: Sep. 14, 2004

(54) MULTIPLE-PASS INTERFEROMETRY

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/352,616

(22) Filed: Jan. 28, 2003

(65) Prior Publication Data

US 2003/0169429 A1 Sep. 11, 2003

Related U.S. Application Data

(60) Provisional application No. 60/352,341, filed on Jan. 28, 2002, and provisional application No. 60/352,425, filed on Jan. 28, 2002.

(51) Int. Cl.⁷ .................................................. G01B 9/02
(52) U.S. Cl. ..................... 356/500; 356/509; 356/520
(58) Field of Search ................................. 356/520, 509, 356/510, 508, 600, 498, 493, 486, 482, 500

(56) References Cited

U.S. PATENT DOCUMENTS

| 4,784,490 A | 11/1988 | Wayne |
| 4,881,815 A | 11/1989 | Sommargren |
| 4,881,816 A | 11/1989 | Zanoni |
| 4,883,357 A | 11/1989 | Zanoni et al. |
| 5,064,289 A | 11/1991 | Bockman |
| 5,483,343 A | 1/1996 | Iwamoto et al. |
| 5,575,160 A | 11/1996 | Keus |
| 5,801,832 A | 9/1998 | Van Den Brink |
| 6,020,964 A | 2/2000 | Loopstra et al. |
| 6,046,792 A | 4/2000 | Van Der Werf et al. |
| 6,252,667 B1 | 6/2001 | Hill et al. |
| 6,271,923 B1 | 8/2001 | Hill |
| 6,552,804 B2 | 4/2003 | Hill |
| 2002/0001087 A1 | 1/2002 | Hill |

OTHER PUBLICATIONS

Hill, Henry. U.S. application 10/227,167 filed Aug. 23, 2002.*
PCT International Search Report, Jan. 28, 2002.

* cited by examiner

Primary Examiner—Samuel A. Turner
Assistant Examiner—Patrick Connolly
(74) Attorney, Agent, or Firm—Fish & Richardson P.C.

(57) ABSTRACT

Interferometry system including a multiple-pass interferometer having reflectors to reflect at least two beams along multiple passes through the interferometer. The multiple passes include a first set of passes and a second set of passes. The reflectors have first alignments that are normal to the directions of the paths of the beams that are reflected by the reflectors. The two beams provide information about changes in a first location on one of the reflectors after the first set of passes, and provide information about changes in the first location and changes in a second location on the reflector after the second set of passes. The paths of the beams are sheared during the first set of passes and during the second set of passes if at least one of the reflectors has an alignment other than the first alignment. The interferometry system includes optics to redirect the beams after the first set of passes and before the second set of passes so that shear imparted during the second set of passes cancels shear imparted during the first set of passes.

52 Claims, 8 Drawing Sheets

MULTIPLE-PASS INTERFEROMETRY

RELATED APPLICATIONS

This application claims priority to U.S. Provisional Application Serial No. 60/352,425 by Henry A. Hill, filed Jan. 28, 2002 and also Claims Benefit of 60/352,341, filed Jan. 28, 2002.

INCORPORATION BY REFERENCE

The following documents are hereby incorporated by reference: U.S. Provisional Patent Application Serial No. 60/309,608 by Henry A. Hill, filed Aug. 2, 2001 (Z-336), U.S. Provisional Patent Application Serial No. 60/314,345 by Henry A. Hill, filed Aug. 23, 2001 (Z-343), U.S. Provisional Patent Application Serial No. 60/314,568 by Henry A. Hill, filed Aug. 23, 2001 (Z-345), U.S. Provisional Patent Application Serial No. 60/352,341 by Henry A. Hill, filed on Jan. 28, 2002 (Z-391), U.S. Provisional Patent Application Serial No. 60/352,425 by Henry A. Hill, filed on Jan. 28, 2002 (Z-396), and U.S. patent application Ser. No. 10/227,167 by Henry A. Hill, filed on Aug. 23, 2002 (Z345).

TECHNICAL FIELD

This invention relates to interferometers, e.g., displacement measuring and dispersion interferometers that measure angular and linear displacements of a measurement object such as a mask stage or wafer stage in a lithography scanner or stepper system.

BACKGROUND

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodynd" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where $v$ is the relative speed of the measurement and reference objects, $\lambda$ is the wavelength of the measurement and reference beams, $n$ is the refractive index of the medium through which the light beams travel, e.g., air or vacuum, and $p$ is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change, e.g., the change in distance to and from a stage that includes the measurement object.

Unfortunately, this equality is not always exact. In addition, the amplitude of the measured interference signal may be variable. A variable amplitude may subsequently reduce the accuracy of measured phase changes. Many interferometers include non-linearities such as what are known as "cyclic errors". The cyclic errors can be expressed as contributions to the phase and/or the intensity of the measured interference signal and have a sinusoidal dependence on the change in optical path length pnL. In particular, the first harmonic cyclic error in phase has a sinusoidal dependence on $(2\pi pnL)/\lambda$ and the second harmonic cyclic error in phase has a sinusoidal dependence on $2(2\pi pnL)/\lambda$. Higher harmonic cyclic errors can also be present.

There are also "non-cyclic non-linearities" such as those caused by a change in lateral displacement (i.e., "beam shear") between the reference and measurement beam components of an output beam of an interferometer when the wavefronts of the reference and measurement beam components have wavefront errors. This can be explained as follows.

Inhomogeneities in the interferometer optics may cause wavefront errors in the reference and measurement beams. When the reference and measurement beams propagate collinearly with one another through such inhomogeneities, the resulting wavefront errors are identical and their contributions to the interferometric signal cancel each other out. More typically, however, the reference and measurement beam components of the output beam are laterally displaced from one another, i.e., they have a relative beam shear. Such beam shear causes the wavefront errors to contribute an error to the interferometric signal derived from the output beam.

Moreover, in many interferometry systems beam shear changes as the position or angular orientation of the measurement object changes. For example, a change in relative beam shear can be introduced by a change in the angular orientation of a plane mirror measurement object. Accordingly, a change in the angular orientation of the measurement object produces a corresponding error in the interferometric signal.

The effect of the beam shear and wavefront errors will depend upon procedures used to mix components of the output beam with respect to component polarization states and to detect the mixed output beam to generate an electrical interference signal. The mixed output beam may for example be detected by a detector without any focusing of the mixed beam onto the detector, by detecting the mixed output beam as a beam focused onto a detector, or by launching the mixed output beam into a single mode or multi-mode optical fiber and detecting a portion of the mixed output beam that is transmitted by the optical fiber. The effect of the beam shear and wavefront errors will also depend on properties of a beam stop should a beam stop be used in the procedure to detect the mixed output beam.

Generally, the errors in the interferometric signal are compounded when an optical fiber is used to transmit the mixed output beam to the detector.

Amplitude variability of the measured interference signal can be the net result of a number of mechanisms. One mechanism is a relative beam shear of the reference and measurement components of the output beam that is for example a consequence of a change in orientation of the measurement object.

In dispersion measuring applications, optical path length measurements are made at multiple wavelengths, e.g., 532 nm and 1064 nm, and are used to measure dispersion of a gas in the measurement path of the distance measuring interferometer. The dispersion measurement can be used in converting the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged.

The interferometers described above are often crucial components of scanner systems and stepper systems used in lithography to produce integrated circuits on semiconductor wafers. Such lithography systems typically include a translatable stage to support and fix the wafer, focusing optics used to direct a radiation beam onto the wafer, a scanner or stepper system for translating the stage relative to the exposure beam, and one or more interferometers. Each interferometer directs a measurement beam to, and receives a reflected measurement beam from, a plane mirror attached to the stage. Each interferometer interferes its reflected measurement beams with a corresponding reference beam, and collectively the interferometers accurately measure changes in the position of the stage relative to the radiation beam. The interferometers enable the lithography system to precisely control which regions of the wafer are exposed to the radiation beam.

In many lithography systems and other applications, the measurement object includes one or more plane mirrors to reflect the measurement beam from each interferometer. Small changes in the angular orientation of the measurement object, e.g., pitch and yaw of a stage, can alter the direction of each measurement beam reflected from the plane mirrors. If left uncompensated, the altered measurement beams reduce the overlap of the exit measurement and reference beams in each corresponding interferometer. Furthermore, these exit measurement and reference beams will not be propagating parallel to one another nor will their wave fronts be aligned when forming the mixed beam. As a result, the interference between the exit measurement and reference beams will vary across the transverse profile of the mixed beam, thereby corrupting the interference information encoded in the optical intensity measured by the detector.

To address this problem, many conventional interferometers include a retroreflector that redirects the measurement beam back to the plane mirror so that the measurement beam "double passes" the path between the interferometer and the measurement object. The presence of the retroreflector insures that the direction of the exit measurement is insensitive to changes in the angular orientation of the measurement object. When implemented in a plane mirror interferometer, the configuration results in what is commonly referred to as a high-stability plane mirror interferometer (HSPMI). However, even with the retroreflector, the lateral position of the exit measurement beam remains sensitive to changes in the angular orientation of the measurement object. Furthermore, the path of the measurement beam through optics within the interferometer also remains sensitive to changes in the angular orientation of the measurement object.

In practice, the interferometry systems are used to measure the position of the wafer stage along multiple measurement axes. For example, defining a Cartesian coordinate system in which the wafer stage lies in the x-y plane, measurements are typically made of the x and y positions of the stage as well as the angular orientation of the stage with respect to the z axis, as the wafer stage is translated along the x-y plane. Furthermore, it may be desirable to also monitor tilts of the wafer stage out of the x-y plane. For example, accurate characterization of such tilts may be necessary to calculate Abbe offset errors in the x and y positions. Thus, depending on the desired application, there may be up to five degrees of freedom to be measured. Moreover, in some applications, it is desirable to also monitor the position of the stage with respect to the z-axis, resulting in a sixth degree of freedom.

To measure each degree of freedom, an interferometer is used to monitor distance changes along a corresponding metrology axis. For example, in systems that measure the x and y positions of the stage as well as the angular orientation of the stage with respect to the x, y, and z axes, at least three spatially separated measurement beams reflect from one side of the wafer stage and at least two spatially separated measurement beams reflect from another side of the wafer stage. See, e.g., U.S. Pat. No. 5,801,832 entitled "Method of and Device for Repetitively Imaging a Mask Pattern on a Substrate Using Five Measuring Axes," the contents of which are incorporated herein by reference. Each measurement beam is recombined with a reference beam to monitor optical path length changes along the corresponding metrology axes. Because the different measurement beams contact the wafer stage at different locations, the angular orientation of the wafer stage can then be derived from appropriate combinations of the optical path length measurements. Accordingly, for each degree of freedom to be monitored, the system includes at least one measurement beam that contacts the wafer stage. Furthermore, as described above, each measurement beam may double-pass the wafer stage to prevent changes in the angular orientation of the wafer stage from corrupting the interferometric signal. The measurement beams may generated from physically separate interferometers or from multi-axes interferometers that generate multiple measurement beams.

SUMMARY

The invention features a multiple-degrees of freedom measuring plane mirror interferometer assembly measures two, three or more degrees of freedom with either zero or substantially reduced differential beam shear at one or more detectors or fiber optic pickups (FOP). In certain embodiments of the present invention, the differential beam shear of reference and measurement beams in one or more interferometers of the interferometer assembly are substantially reduced. The interferometer assembly may include a single interferometer optical assembly. A two-degrees of freedom measuring plane mirror interferometer assembly with zero or substantially reduced differential beam shear at one detector or FOP may be configured to measure two linear displacements of two separated locations on a plane mirror or measure both a linear displacement and an angular displacement of a plane mirror. In certain of the configurations, the differential beam shear of reference and measurement beams in one of the corresponding interferometers of the configuration is substantially reduced.

The techniques described herein may be extended to measure additional degrees of freedom using the interferometer configurations disclosed in U.S. patent application Ser. No. 60/352,341 by Henry A. Hill and filed on Jan. 28, 2002 (Z-391), which was incorporated by reference. Such embodiments include a three-degrees of freedom measuring plane mirror interferometer assembly with zero or substantially reduced differential beam shear at one or more detectors and/or FOP's may be configured to measure three linear displacements of three separated locations on a plane mirror or a linear displacement and two orthogonal angular displacements of a plane mirror or to measure two linear displacements and one angular displacement. In certain of the configurations, the differential beam shear of reference and measurement beams in one or more of the corresponding interferometers of the configuration are substantially reduced. Further embodiments include a four or more degrees of freedom measuring plane mirror interferometer assembly with zero or reduced differential beam shear at one or more detectors and/or FOP's may be configured to measure other combinations of linear and angular displacements. In certain of the configurations, the differential beam shear of reference and measurement beams in one or more of the corresponding interferometers of the certain of the configurations are substantially reduced.

A single plane mirror may be used both as the reference object and measurement object in the measurement of changes in orientation of an object. The reference and measurement beams used in the measurement of angles may make single passes to the single plane mirror. The interferometer optical assembly may include high stability configurations for either or both the linear and angular displacement interferometers. The interferometer optical assembly may be configured so that there is either zero or reduced differential beam shear between the reference and measurement beam components at a detector or FOP for beams used in measurement of an angle. The beam shears of the reference and measurement beams at the single plane mirror are zero for the reference and measurement beams used in the angular displacement interferometers. Two or more linear and angular displacement output beams may have a common measurement beam path in a pass to the single plane mirror. The interferometer assemblies may be configured so that the respective reference and measurement beam optical path lengths of the linear and angular displacement interferometers are of equal lengths in glass and/or equal lengths in a gas.

In general, in one aspect, the invention features an apparatus that includes a multiple-pass interferometer. The multiple-pass interferometer includes reflectors to reflect at least two beams along multiple passes through the interferometer, the multiple passes including a first set of passes and a second set of passes. The reflectors have first alignments that are normal to the directions of the paths of the beams that are reflected by the reflectors. The two beams provide information about changes in a first location on one of the reflectors after the first set of passes. The two beams provide information about changes in the first location and changes in a second location on the reflector after the second set of passes. The paths of the beams are sheared during the first set of passes and during the second set of passes if at least one of the reflectors has an alignment other than the first alignment. The interferometer includes optics to redirect the beams after the first set of passes and before the second set of passes so that shear imparted during the second set of passes cancels shear imparted during the first set of passes.

Embodiments of the apparatus may include one or more of the following features.

The optics are configured to redirect the beams while maintaining the magnitude and direction of shear between the two beams. The propagation path of one of the two beams after being redirected by the optics is parallel to the propagation path of the other one of the two beams after completing the first set of passes. The reflectors include plane reflection surfaces. The beams include a reference beam that is directed toward one of the reflectors maintained at a position that is stationary relative to the interferometer. The beams include a measurement beam that is directed towards one of the reflectors that is movable relative to the interferometer. The paths of the reference and measurement beams define an optical path length difference, the changes in the optical path length difference indicative of changes in the position of the one of the reflectors that is movable relative to the interferometer. The reflectors include a first reflector and a second reflector, the beams comprising a first beam directed toward the first reflector and a second beam directed toward the second reflector, each of the first and second reflectors being movable relative to the interferometer.

The paths of the first and second beams define an optical path length difference, the changes in the optical path length difference indicative of changes in relative positions of the first and second reflectors. The first set of passes consists of two passes, and during each pass each of the beams is reflected by one of the reflectors at least once. The second set of passes consists of two passes, and during each pass each of the beams is reflected by one of the reflectors at least once. The multiple-pass interferometer includes a beam splitter that separates an input beam into the beams and directs the beams toward the reflectors. The beam splitter includes a polarizing beam splitter. The optics may include an odd number of reflection surfaces. Normals of the reflection surfaces lie in a common plane. The reflection surfaces include plane reflection surfaces.

For each beam redirected by the optics, the beam is reflected by the reflection surfaces such that a sum of angles between incident and reflection beams of each reflection surface is zero or an integer multiple of 360 degrees, the angle measured in a direction from the incident beam to the reflection beam, the angle having a positive value when measured in a counter clockwise direction and a negative value when measured in a clockwise direction.

The interferometer combines the beams after the beams travel through the first and second set of passes to form overlapping beams that exit the interferometer. The optics may consist of one reflection surface. The optics may include an even number of reflection surfaces. The optics include a cube corner retroreflector. The interferometer includes a differential plane mirror interferometer. The two beams have different frequencies.

In general, in another aspect, the invention features a lithography system for use in fabricating integrated circuits on a wafer. The lithography system includes a detector that responds to optical interference between the overlapping beams and produces an interference signal indicative of an optical path length difference between the paths of the beams. The detector include a photodetector, an amplifier, and an analog-to-digital converter. An analyzer is coupled to the detector to estimate a change in an optical path length difference of the beams based on the interference signal. A source provides the beams.

In general, in another aspect, the invention features a lithography system for use in fabricating integrated circuits on a wafer. The lithography system includes a stage to support the wafer, an illumination system to image spatially patterned radiation onto the wafer, a positioning system to adjust the position of the stage relative to the imaged radiation, and any of the interferometetric apparatuses described above. The interferometric apparatus include an interferometer for measuring the position of the stage relative to the patterned radiation.

In general, in another aspect, the invention features a lithography system for use in fabricating integrated circuits on a wafer. The lithography system includes a stage to support a wafer for fabricating integrated circuits thereon, and an illumination system including a radiation source, a mask, a positioning system, a lens assembly, and any of the interferometric apparatuses described above. During operation, the source directs radiation through the mask to produce spatially patterned radiation, the positioning system adjusts the position of the mask relative to the radiation from the source, the lens assembly images the spatially patterned radiation onto the wafer, and the interferometer of the interferometric apparatus is used to monitor the position of the mask relative to the wafer.

In general, in another aspect, the invention features a lithography system for use in fabricating a lithography mask. The lithography system includes a source to provide a write beam to pattern a lithography mask, a stage to support the lithography mask, a beam directing assembly to deliver the write beam to the lithography mask, a positioning system to position the stage and beam directing assembly relative to one another, and any of the interferometric apparatuses described above. The interferometric apparatus includes an interferometer for measuring the position of the stage relative to the beam directing assembly.

Integrated circuits may be fabricated by using any of the lithography systems described above to support a wafer, image spatially patterned radiation onto the wafer, and adjust the position of the stage relative to the imaged radiation, in which the interferometer is used to measure the position of the stage.

Integrated circuits may be fabricated by using any of the lithography systems described above to support a wafer, direct radiation from the source through a mask to produce spatially patterned radiation on the wafer, adjust the position of the mask relative to the radiation from the source, and image the spatially patterned radiation onto the wafer. The interferometer of the lithography system is used to measure the position of the mask relative to the wafer.

Lithography masks may be fabricated by using any of the lithography systems described above to support the lithography mask, deliver a write beam to the lithography mask, and position the stage and beam directing assembly relative to one another. The interferometer of the lithography system is used to measure the position of the stage relative to the beam directing assembly.

In general, in another aspect, the invention features a method, including directing a first measurement beam along a first set of passes through an interferometer to a first region on a measurement object, directing a first reference beam along a first set of passes through the interferometer to a reference object, combining the first measurement and reference beams to produce a first output beam after the first measurement and reference beams complete the first set of passes, determining a change in position in the first region on the measurement object, using optics to direct a portion of the first measurement beam to form a second measurement beam, using the optics to direct a portion of the first reference beam to form a second reference beam, directing the second measurement beam along a second set of passes through the interferometer to a second region on the measurement object, directing the second reference beam along a second set of passes through the interferometer to the reference object, combining the second measurement and reference beams to produce a second output beam after the second measurement and reference beams complete the second set of passes, and determining a change in position in the second region on the measurement object. A rotation of the measurement object relative to the directions of the paths of the first and second measurement beams that are incident on the measurement object imparts beam shear to the first measurement beam during the first set of passes and to the second measurement beam during the second set of passes. The optics are configured to redirect the portion of the first measurement and reference output beams so that shear imparted upon the second measurement beam during the second set of passes cancels shear imparted upon the first measurement beam during the first set of passes.

The method may further include additional features corresponding to any of the features described above in connection with the different apparatuses.

In general, in another aspect, the invention features a lithography method for use in fabricating integrated circuits on a wafer. The method includes supporting the wafer on a moveable stage, imaging spatially patterned radiation onto the wafer, adjusting the position of the stage relative to the imaged radiation, and monitoring the position of the stage relative to the imaged radiation using any of the interferometric methods described above.

In general, in another aspect, the invention features a lithography method for use in fabricating integrated circuits on a wafer. The method includes directing input radiation through a mask to produce spatially patterned radiation, positioning the mask relative to the input radiation, monitoring the position of the mask relative to the input radiation using any of the interferometric methods described above, and imaging the spatially patterned radiation onto the wafer.

In general, in another aspect, the invention features a lithography method for use in fabricating integrated circuits on a wafer. The method includes positioning a first component of a lithography system relative to a second component of a lithography system to expose the wafer to spatially patterned radiation, and monitoring the position of the first component relative to the second component using any of the interferometric methods described above.

In general, in another aspect, the invention features a lithography method for use in fabricating a lithography mask. The method includes directing a write beam to a substrate to pattern the substrate, positioning the substrate relative to the write beam, and monitoring the position of the substrate relative to the write beam using any of the interferometric methods described above.

In general, in another aspect, the invention features an apparatus including a multiple degree of freedom interferometer for measuring changes in position of a measurement object with respect to multiple degrees of freedom. The interferometer is configured to receive an input beam, direct a first-measurement beam derived from the input beam to make first and second passes to the measurement object about a first point on the measurement object, and then combine the first measurement beam with a first reference beam derived from the input beam to produce a first output beam comprising information about changes in distance to the first point on the measurement object. The interferometer is further configured to direct a second-measurement beam derived from the input beam to make first and second passes to the measurement object about a second point on the measurement object, and then combine the second measurement beam with a second reference beam derived from the input beam to produce a second output beam comprising information about changes in distance to the second point on the measurement object. The interferometer includes fold optics positioned to reflect a portion of the first output beam an odd number of times in a plane defined by the incidence of the measurement beams on the measurement objects to define a secondary input beam. The second measurement beam and the second reference beam are derived from the secondary input beam.

Embodiments of the apparatus may include one or more of the following features.

The interferometer includes a polarizing beam splitter for directing the different beams along their respective paths, a first quarter wave plate positioned between the polarizing beam splitter and a reference object, and a second quarter wave plate positioned between the polarizing beam splitter and the measurement object. The reference object includes a plane mirror oriented substantially normal to the incident beam portions. The fold optics include a non-polarizing beam splitter positioned to separate a portion of the first output beam to define the secondary input beam and direct it back to the polarizing beam splitter to produce the second measurement beam and the second reference beam. The fold optics include a plurality of reflective surfaces positioned to direct the secondary input beam from the non-polarizing beam splitter to the polarizing beam splitter, and wherein the non-polarizing beam splitter and the plurality of reflective surfaces reflect the second input beam an odd number of times prior to reaching the polarizing beam splitter. The non-polarizing beam splitter reflects the first output beam to produce the secondary input beam, and the plurality of reflective surfaces reflects the secondary input beam an even number of times. The apparatus includes a first fiber optic pickup for coupling the first output beam to a detector and a second fiber optic pickup for coupling the second output beam to a detector.

In general, in another aspect, the invention features a lithography system for use in fabricating integrated circuits on a wafer. The lithography system includes a stage for supporting the wafer, an illumination system for imaging spatially patterned radiation onto the wafer, a positioning system for adjusting the position of the stage relative to the imaged radiation, and any of the interferometric apparatuses described above for monitoring the position of the wafer relative to the imaged radiation.

In general, in another aspect, the invention features a lithography system for use in fabricating integrated circuits on a wafer. The lithography system includes a stage for supporting the wafer, and an illumination system including a radiation source, a mask, a positioning system, a lens assembly, and any of the interferometric apparatuses described above. During operation, the source directs radiation through the mask to produce spatially patterned radiation, the positioning system adjusts the position of the mask relative to the radiation from the source, the lens assembly images the spatially patterned radiation onto the wafer, and the interferometer of the interferometric apparatus monitors the position of the mask relative to the radiation from the source.

In general, in another aspect, the invention features a beam writing system for use in fabricating a lithography mask. The system includes a source providing a write beam to pattern a substrate, a stage supporting the substrate, a beam directing assembly for delivering the write beam to the substrate, a positioning system for positioning the stage and beam directing assembly relative one another, and any of the interferometric apparatuses described above for monitoring the position of the stage relative to the beam directing assembly.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Embodiments of the present invention have interferometer assemblies that may include one or more linear displacement interferometers and one or more angular displacement interferometers. The interferometer assemblies may include single, i.e. integral optical assemblies. The linear displacement interferometers include a double pass interferometer such as a high stability plane mirror interferometer (HSPMI) or a differential plane mirror interferometer (DPMI). The angular displacement interferometers include plane mirror interferometers wherein a single plane mirror serves as both the reference and measurement beam objects of an angle measuring interferometer. Embodiments of the interferometer assemblies will be described wherein the interferometer assemblies may include one or more linear displacement interferometers and one or more angular displacement interferometers.

Figure 1:
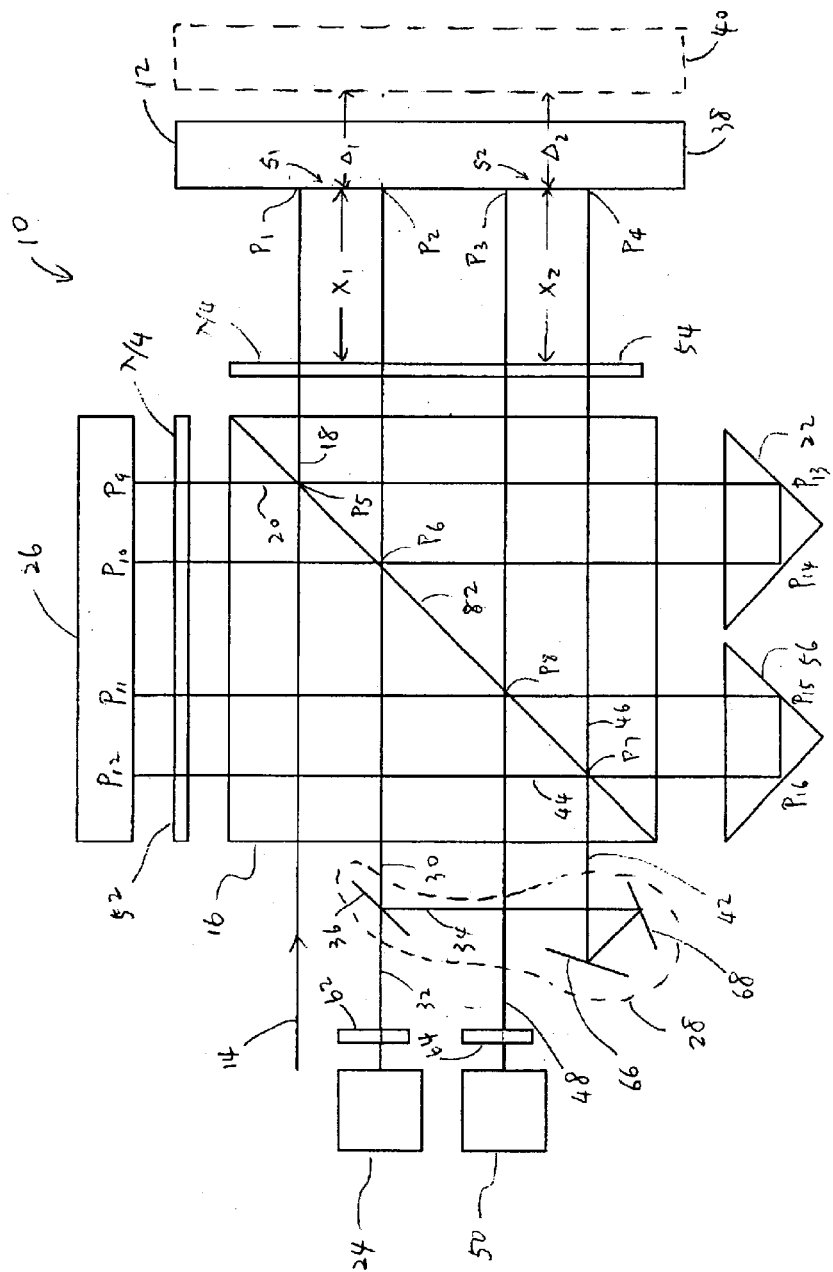
FIGS. 1 and 2 show interferometry systems.

Referring to FIG. 1, an interferometer assembly 10 includes a high stability plane mirror interferometer (HSPMI) and a four-pass linear displacement interferometer in a single assembly. An input beam 14 makes two passes through a first HSPMI to form a pair of overlapping output beams 30. The phases of a portion of output beams 30 are measured to obtain changes in a displacement X1 of a measurement mirror 12 at one location. A portion of output beams 30 is used as an input beam to a second HSPMI to form the four-pass interferometer. The four-pass interferometer measures changes in a displacement X1+X2, where X2 is the displacement of measurement mirror 12 at a second location. The displacements X1 and X2 may be used to measure linear movement and rotational movement of mirror 12 relative to a reference point. A reflector assembly 28 (enclosed in dashed lines) reduces beam shear in a measurement beam and a reference beam caused by a tilt in mirror 12, resulting in more accurate measurements of changes in the displacement X2.

Input beam 14 is configured to have orthogonal linearly polarized components having a small frequency difference sufficient for heterodyne detection. A polarizing beam splitter (PBS) 16 includes a beam splitting surface 82 that, at point P5, separates orthogonal components of input beam 14 into a reference beam 20 and a measurement beam 18. Reference beam 20 and measurement beam 18 makes two passes through interferometer assembly 10, and exits PBS 16 to form exit beams 30.

Measurement beam 18 (which is transmitted through surface 82) is mostly polarized in a direction parallel to the plane of incidence. Here, the plane of incidence is parallel to the plane of the paper of FIG. 1. Reference beam 20 (which is reflected from surface 82) is mostly polarized perpendicular to the plane of incidence.

Reference beam 20 travels along a first reference path that contacts a reference mirror 26. Measurement beam 18 travels along a first measurement path contacting measurement mirror 12. Both the reference and measurement mirrors are plane mirrors. In the figures, a beam overlaps with a path where the beam travels, thus the beam and path are depicted by the same line. Measurement mirror 12 may be attached to an object (e.g., a lithography stage).

The following is a description of the paths traveled by measurement beam 18 and reference beam 20 after they separate at point P5 and until they rejoin as output beams 30. In the description of FIG. 1, it is assumed that measurement mirror 12 and PBS 16 are initially aligned such that the surface of mirror 12 is positioned at an angle of 45 degrees relative to beam-splitting surface 82.

After reflection by surface 82 at point P5, reference beam 20 makes two passes through interferometer assembly 10 before exiting PBS 16 as a component of output beams 30. During the first pass, reference beam 20 travels towards mirror 26, passes through a quarter wave plate 52, and is reflected by mirror 26 at point P9. Reference beam 26 passes through quarter wave plate 52 a second time, travels towards a retroreflector 22, and is reflected by retroreflector 22 at points P13 and P14.

During the second pass, reference beam 26 travels towards mirror 26, passes quarter wave plate 52 a third time, and is reflected by mirror 26 at point P10. Reference beam 26 passes through quarter wave plate 52 a fourth time, travels towards surface 82, is reflected by surface 82 at point P6, then travels towards a detector 24, forming a component of output beams 30.

After passing through surface 82 at point P5, measurement beam 20 makes two passes through interferometer assembly 10 before exiting PBS 16 as a component of output beams 30. During the first pass, measurement beam 18 travels towards mirror 12, passes through a quarter wave plate 54, and is reflected by mirror 12 at point P1. Measurement beam 18 passes through quarter wave plate 54 a second time, and is reflected by surface 82 at point P5. Measurement beam 18 travels towards retroreflector 22, and is reflected by retroreflector 22 at points P13 and P14.

During the second pass, measurement beam 18 travels towards surface 82, is reflected by surface 82 at point P6, and travels towards mirror 12. Measurement beam 18 passes quarter wave plate 54 a third time, and is reflected by mirror 12 at point P2. Measurement beam 18 passes through quarter wave plate 54 a fourth time, passes through surface 82 at point P6, then travels towards detector 24, becoming a component of output beams 30.

Measurement beam 18 and reference beam 20, after exiting PBS 16, form overlapping output beams 30 that travel toward detector 24. A non-polarizing beam splitter 36 separates beams 30 into beams 32 and beams 34. Beams 32 passes through a polarizer 62 and are detected by detector 24. When measurement mirror 12 moves from a position 38 to another position 40, the optical path length difference between first reference path and first measurement path will change, resulting in changes in an interference of the overlapping exit beams 32 that can be detected by detector 24. An analyzer then calculates a physical change in position $\Delta_1$ based on the changes in the optical path length difference. $\Delta_1$ represents an average of the position changes of points P1 and P2 on mirror 12 relative to PBS 16.

Beam splitter 36 is part of a reflector assembly 28 that receives beams 30 and redirects a portion of beams 30 into beams 42. Beams 42 becomes the input beams of the second HSPMI. Beams 42 are separated by beam splitting surface 82 at point P7 into a reference beam 44 and a measurement beam 46. Reference beam 44 travels along a second reference path that contacts reference mirror 26, and measurement beam 46 travels along a second measurement path contacting measurement mirror 12. The following is a description of the paths traveled by measurement beam 46 and reference beam 44 after they separate at point P7 and until they rejoin as output beams 48.

After reflection by surface 82 at point P7, reference beam 44 makes two additional passes through interferometer assembly 10 before exiting PBS 16 as a component of output beams 48. During the third pass, reference beam 44 travels towards mirror 26, passes through quarter wave plate 52, and is reflected by mirror 26 at point P12. Reference beam 44 passes through quarter wave plate 52 a second time, travels towards retroreflector 22, and is reflected by retroreflector 56 at points P16 and P15.

During the fourth pass, reference beam 44 travels towards mirror 26, passes quarter wave plate 52 a third time, and is reflected by mirror 26 at point P11. Reference beam 44 passes through quarter wave plate 52 a fourth time, travels towards surface 82, is reflected by surface 82 at point P8, then travels towards a detector 50, become a component of output beams 48.

After passing through surface 82 at point P7, measurement beam 46 makes two additional passes through interferometer assembly 10 before exiting PBS 16 as a component of output beams 48. During the third pass, measurement beam 46 travels towards mirror 12, passes through quarter wave plate 54, and is reflected by mirror 12 at point P4. Measurement beam 18 passes through quarter wave plate 54 a second time, and is reflected by surface 82 at point P7. Measurement beam 18 travels towards retroreflector 56, and is reflected by retroreflector 56 at points P16 and P15.

During the fourth pass, measurement beam 18 travels towards surface 82, is reflected by surface 82 at point P8, and travels towards mirror 12. Measurement beam 18 passes quarter wave plate 54 a third time, and is reflected by mirror 12 at point P3. Measurement beam 18 passes through quarter wave plate 54 a fourth time, passes through surface 82 at point P8, then travels towards detector 50, becoming a component of output beams 48.

Measurement beam 46 and reference beam 44, after exiting PBS 16, form overlapping output beams 48 of the second HSPMI that travel toward detector 50. Beams 48 pass through a polarizer 64 and are detected by detector 50. When measurement mirror 12 moves from position 38 to position 40, the optical path length difference between the second reference path and the second measurement path will change (in addition to the change in optical path length difference between the first reference and measurement paths), resulting in changes in an interference of the overlapping exit beams 48 that can be detected by detector 50. An analyzer then calculates a physical change in $\Delta = \Delta_1 + \Delta_2$ based on the changes in the optical path length difference. The change in position $\Delta_2$ is obtained by subtracting $\Delta_1$ from $\Delta$. $\Delta_2$ represents an average of the position changes of points P3 and P4 on mirror 12 relative to PBS 16.

By measuring $\Delta_1$ and $\Delta_2$, it is possible to determine an average linear movement of mirror 12 relative to PBS 16 by calculating $(\Delta_1 + \Delta_2)/2$. It is also possible to determine a rotational movement by calculating $(\Delta_1 - \Delta_2)$, which, when divided by a distance between a midpoint (of P1 and P2) and a midpoint (of P3 and P4), is roughly equal to the rotational angle of mirror 12 relative to PBS 16.

Figure 2:
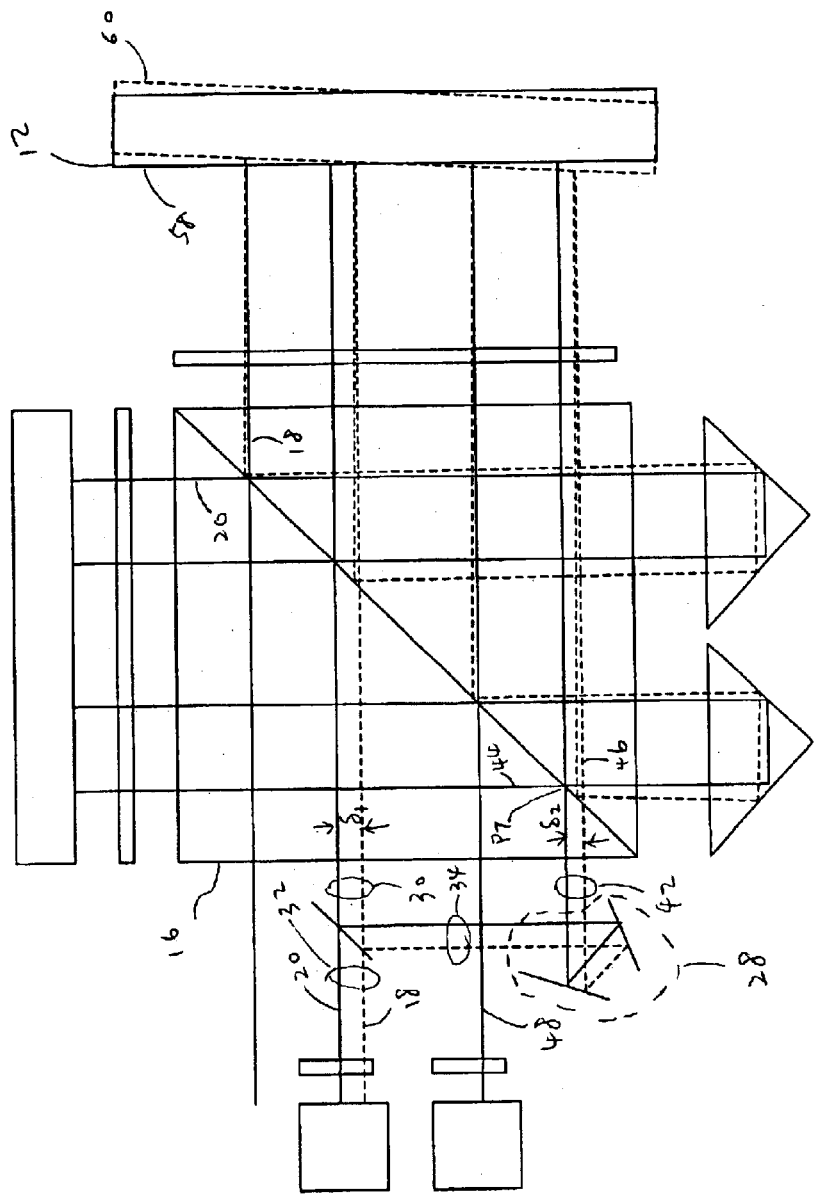

Referring to FIG. 2, when mirror 12 rotates from a position 58 to another position 60, a relative shear $\delta 1$ occurs between the two components (measurement beam 18 and reference beam 20) of output beams 32. Reflector assembly 28 redirects beams 34 to form beams 42. A relative shear $\delta 2$ is formed between the two components (which later become beams 44 and 46) of beams 42. Reflector assembly 28 is designed so that the relative shear $\delta 2$ is substantially the same as the relative shear $\delta 1$. The direction of shear between reference and measurement beams of beams 42 are also substantially the same as the direction of between reference and measurement beams of beams 42.

After passing through P7, measurement beam 46 makes two the third and fourth passes through PBS 16. Tracing a shear between measurement beam 46 and an ideal measurement path (traveled by the measurement beam if mirror 12 were at position 58), it can be seen that the shear imparted during the first and second passes is canceled as the measurement beam makes the third and fourth passes through interferometer system 10.

An advantage of using interferometer assembly 10 is that, when mirror 12 is tilted, the relative (or differential) beam shear of the components of output beams 48 from the second HSPMI is zero. The overall beam shear of the components of the output beam 48 (relative to an intended beam path when mirror 12 is not tilted) from the second HSPMI is also zero. The two components making up the output beams 30 for the first HSPMI are parallel, The two components making up the output beams 48 for the second HSPMI are also parallel.

Figure 3:
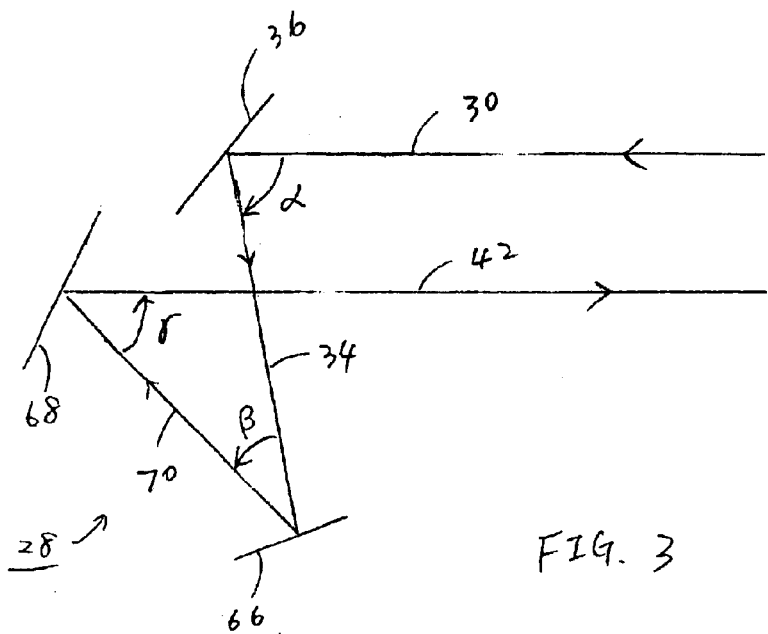
FIGS. 3–5 show reflector assemblies.
Figure 4:
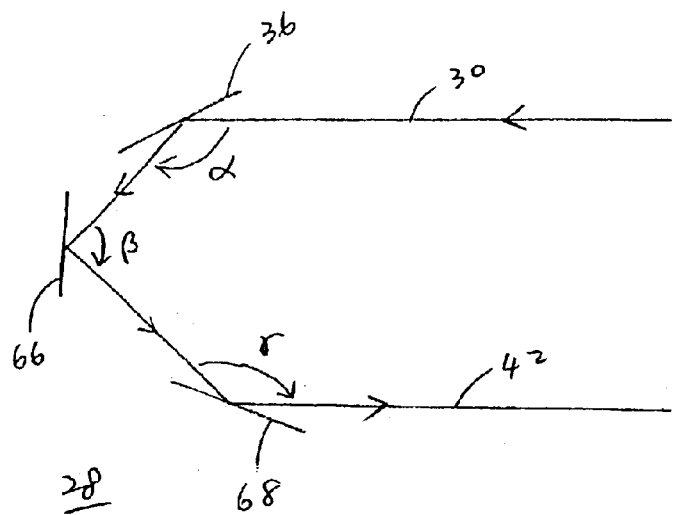

The following describes configurations for reflector assembly 28. In addition to beam splitter 36, reflector assembly 28 includes reflectors 66 and 68. Beam splitter 36 and reflectors 66 and 68 may be arranged in several different configurations. FIGS. 3 and 4 show two examples of suitable configurations for reflector assembly 28. Beam splitter 36 and reflectors 66 and 68 are arranged so that the sum of the angles between incident and reflection beams are zero or multiples of 360 degrees.

As an illustration, a beam 30 is reflected by beam splitter 36 into beam 34, which is reflected by reflector 66 into beam 70, which is reflected by reflector 68 into beam 42. In FIG. 2, angle $\alpha$ has a negative value (representing a clockwise rotation from beam 30 to beam 34), angle $\beta$ has a positive value (representing a counter clockwise rotation from beam 34 to beam 70), and angle $\gamma$ has a positive value. Beam splitter 36 and reflectors 66 and 68 are arranged so that $\alpha + \beta + \gamma = 0$.

In FIG. 3, angles $\alpha$, $\beta$, and $\gamma$ have negative values (representing clockwise rotation from an incident beam of a mirror to a reflection beam). Beam splitter 36 and reflectors 66 and 68 are arranged so that $\alpha + \beta + \gamma = 360$ degrees. In general, the mirrors can be arranged in different configurations as long as the sum of $\alpha$, $\beta$, and $\gamma$ are zero or multiples of 360 degrees.

Figure 5:
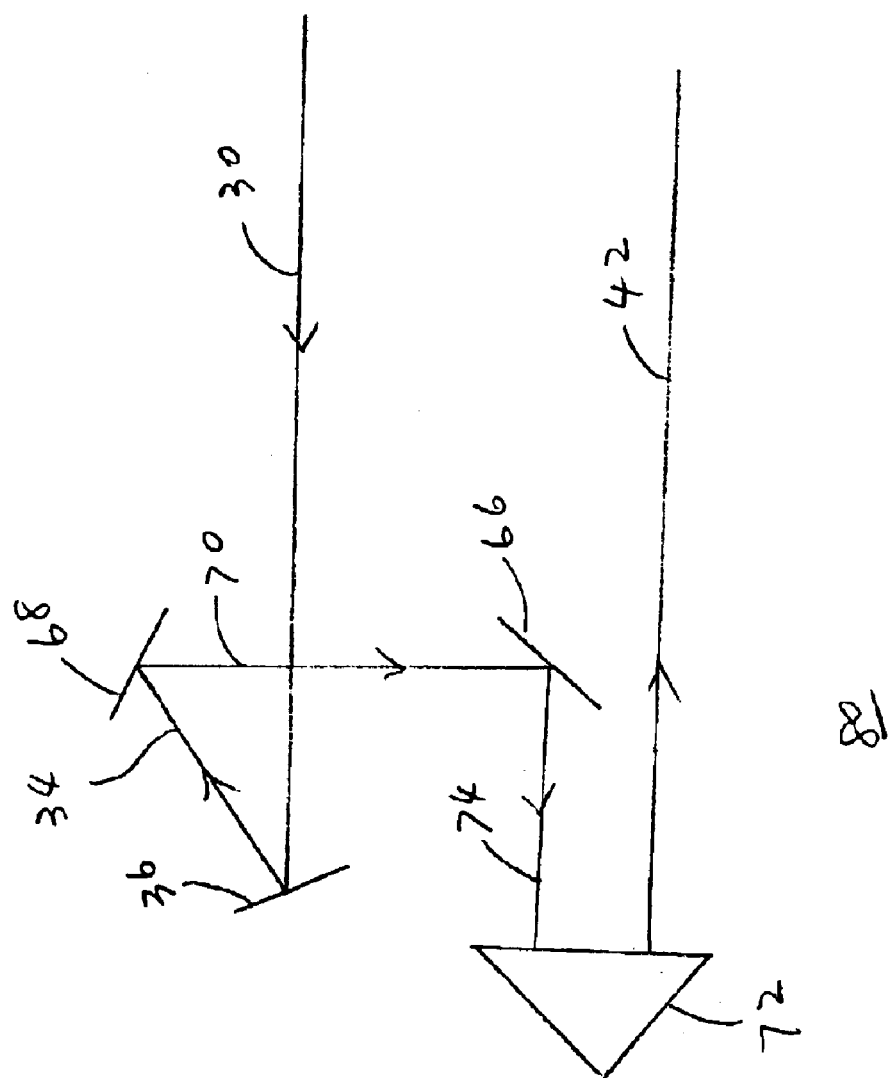

In FIGS. 3 and 4, the beam splitter and reflectors have normals that lie in a common plane (the plane of FIGS. 3 and 4). In general, it is possible to design the reflector assembly so that the normals of the beam splitter and reflectors do not lie in a common plane but will still compensate a shear caused by a tilt of the measurement mirror. For example, in FIG. 5, a reflector assembly 80 includes mirrors beam splitter 36, reflectors 66 and 68, and a cube corner retroreflector 72, with a total of six reflection surfaces (the normals of the reflection surfaces of the retroreflector do not lie in a common plane).

Beam splitter 36 and reflectors 66 and 68 are arranged so that a beam 74 (formed after reflection by beam splitter 36 and reflectors 66 and 68) is parallel to beam 30, and both beams 30 and 74 travel in the same direction. Retroreflector 72 redirects beam 74 into beam 42. Beam 42 is parallel to beam 30 but travel in opposite directions. Reflector assembly 80 has the same transformation properties as reflector assembly 28 of FIG. 3 or 4, such that the magnitude and direction of beam shear of beam 42 is the same as the magnitude and direction of beam shear of beam 30.

In the examples shown in FIGS. 1–4, reflector assembly 28 included three plane reflecting surfaces (one from beam splitter 36 and two from reflectors 66 and 68). In other examples, another odd number (greater than three) of plane reflectors can be used as well. An odd number of reflections from the beam splitter and reflectors that have normals that lie in a common plane will cause the direction and magnitude of shear between beams incident on the reflector assembly to be the same the direction and magnitude of shear between the beams that are reflected from the reflector assembly, where the shear is caused by a tilt of the measurement mirror.

The reflector assemblies shown in FIGS. 1–5 can compensate for beam shear caused by an arbitrary rotation of the measurement mirror, i.e., a rotation about either of two axes that are orthogonal with respect to each other and orthogonal to the normal to the measurement mirror. Regardless of the magnitude and direction of shear due to a tilt in the measurement mirror, the shear imparted to the measurement beam during the first and second passes will be canceled by shear imparted to the measurement beam during the third and fourth passes.

Variants of the interferometry system described above may include additional linear and angular displacement interferometers in an interferometer assembly or in a single interferometer assembly to produce interferometer systems that measure three or more degrees of freedom wherein the output beams of the additional interferometers may have zero or reduced differential beam shear at respective detectors/FOP's. Variants of the interferometry system may also include one or more dynamic elements to compensate for any tilt at the measurement object. For example, a dynamic element can be introduced to couple the output beam(s) from the interferometer into the detector. The dynamic element can compensate for any change in the overall propagation direction of the output beam caused by changes in the angular orientation of the measurement object. Such dynamic elements are disclosed in commonly owned U.S. Pat. Nos. 6,271,923 and 6,313,918, the contents of which are incorporated herein by reference.

The interferometry systems described above provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997).

Overlay depends directly on the performance, i.e. accuracy and precision, of the distance measuring interferometers used to position the wafer and reticle (or mask) stages. Since a lithography tool may produce $50–100 M/year of product, the economic value from improved performance distance measuring interferometers is substantial. Each 1% increase in yield of the lithography tool results in approximately $1 M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photochemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as cyclic error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 6:
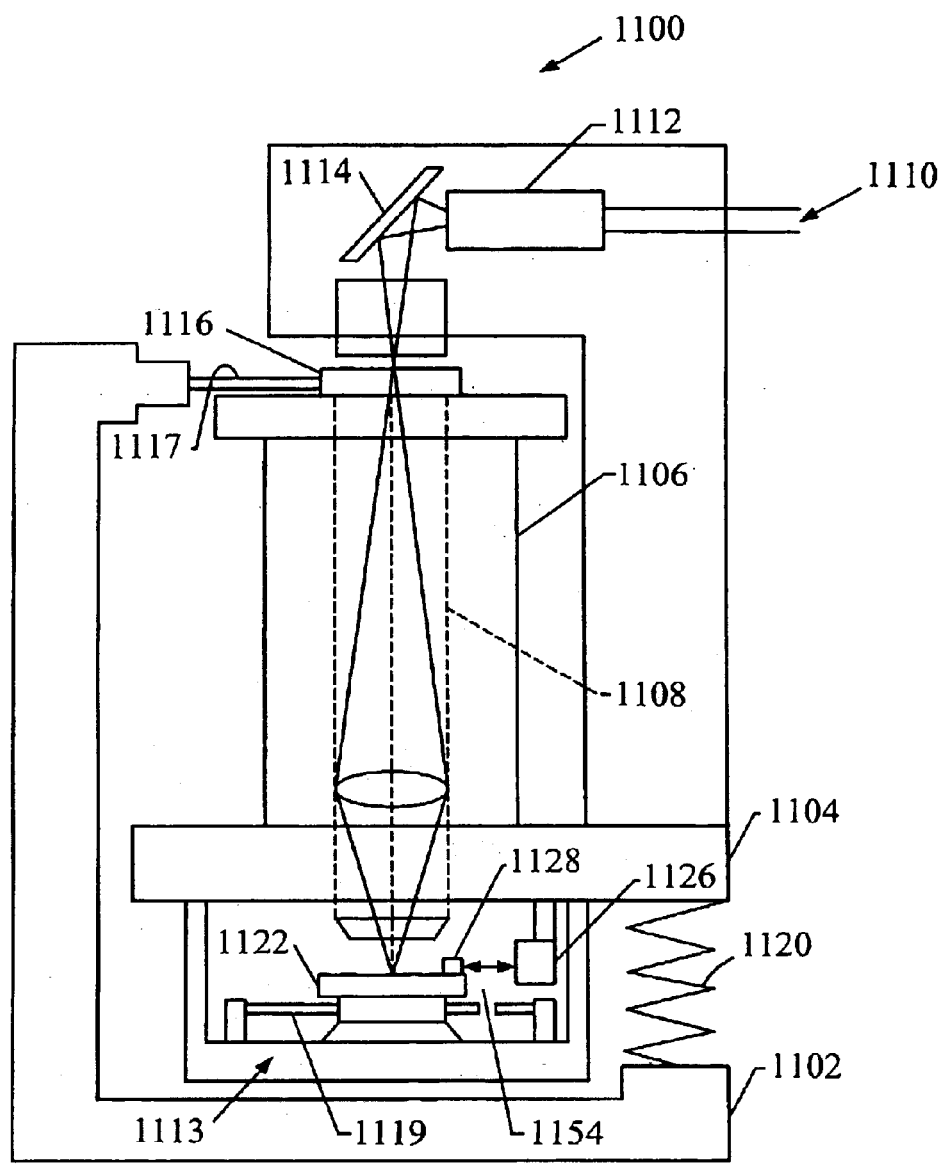
FIG. 6 is a schematic diagram of a lithography system used to make integrated circuits.

An example of a lithography scanner 1100 using an interferometry system 1126 is shown in FIG. 6. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 7:
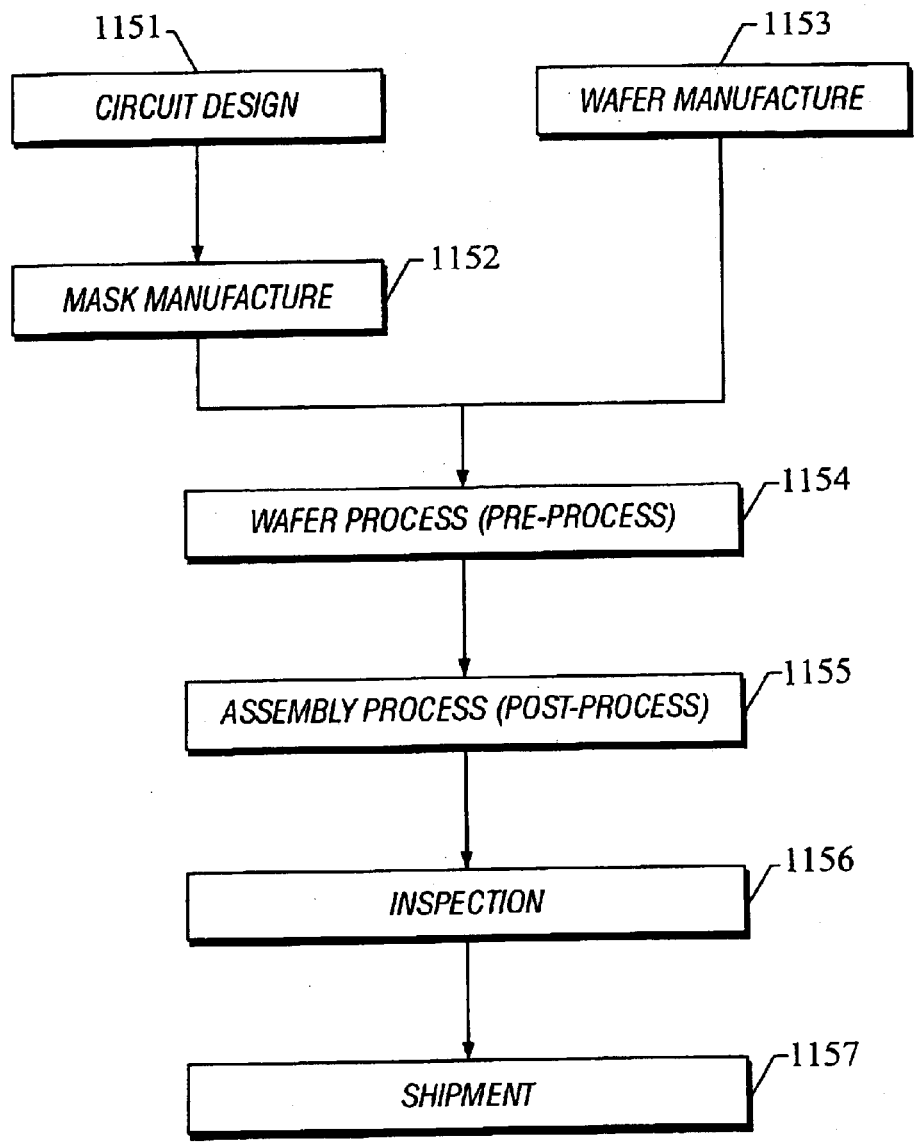
FIGS. 7 and 8 are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 7 and 8. FIG. 7 is a flow chart of the sequence of manufacturing a semiconductor device such as a semiconductor chip (e.g. IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 8:
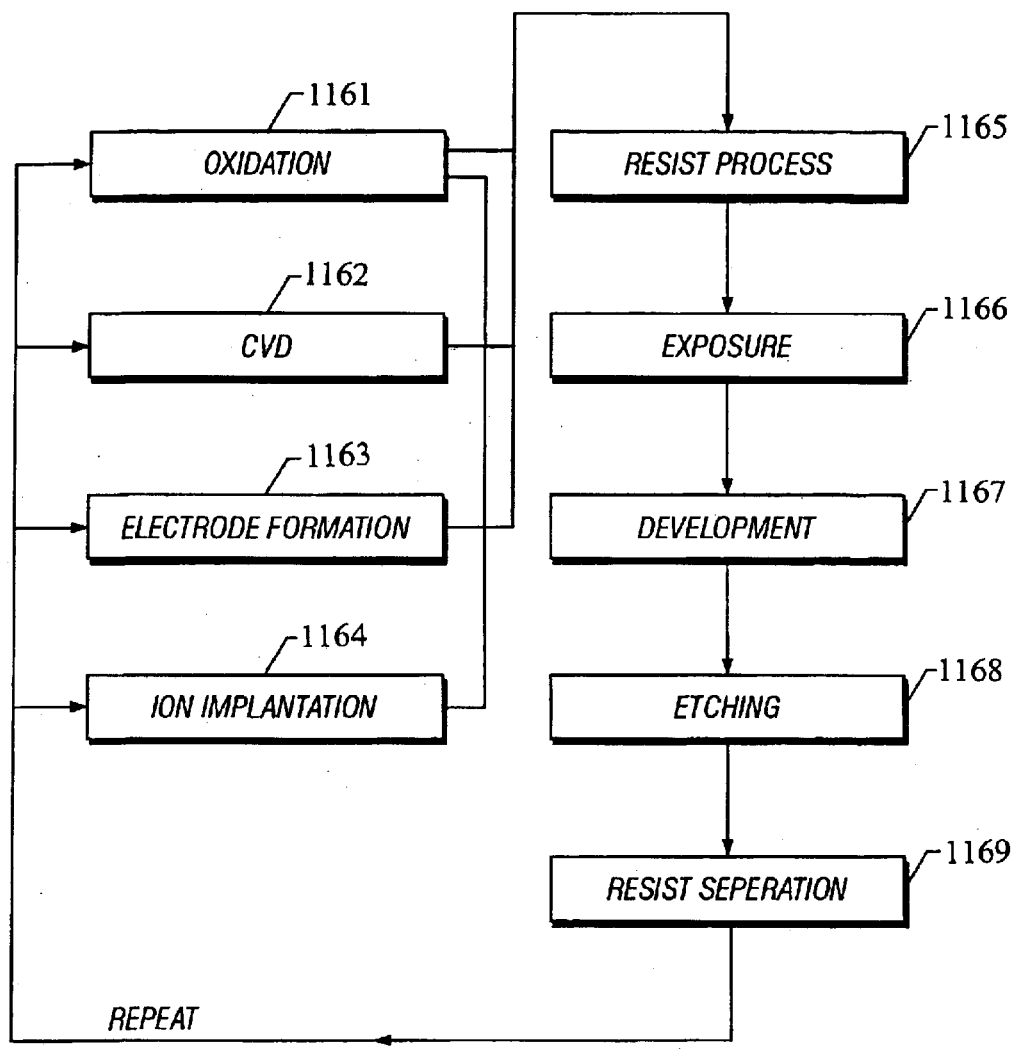

FIG. 8 is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 9:
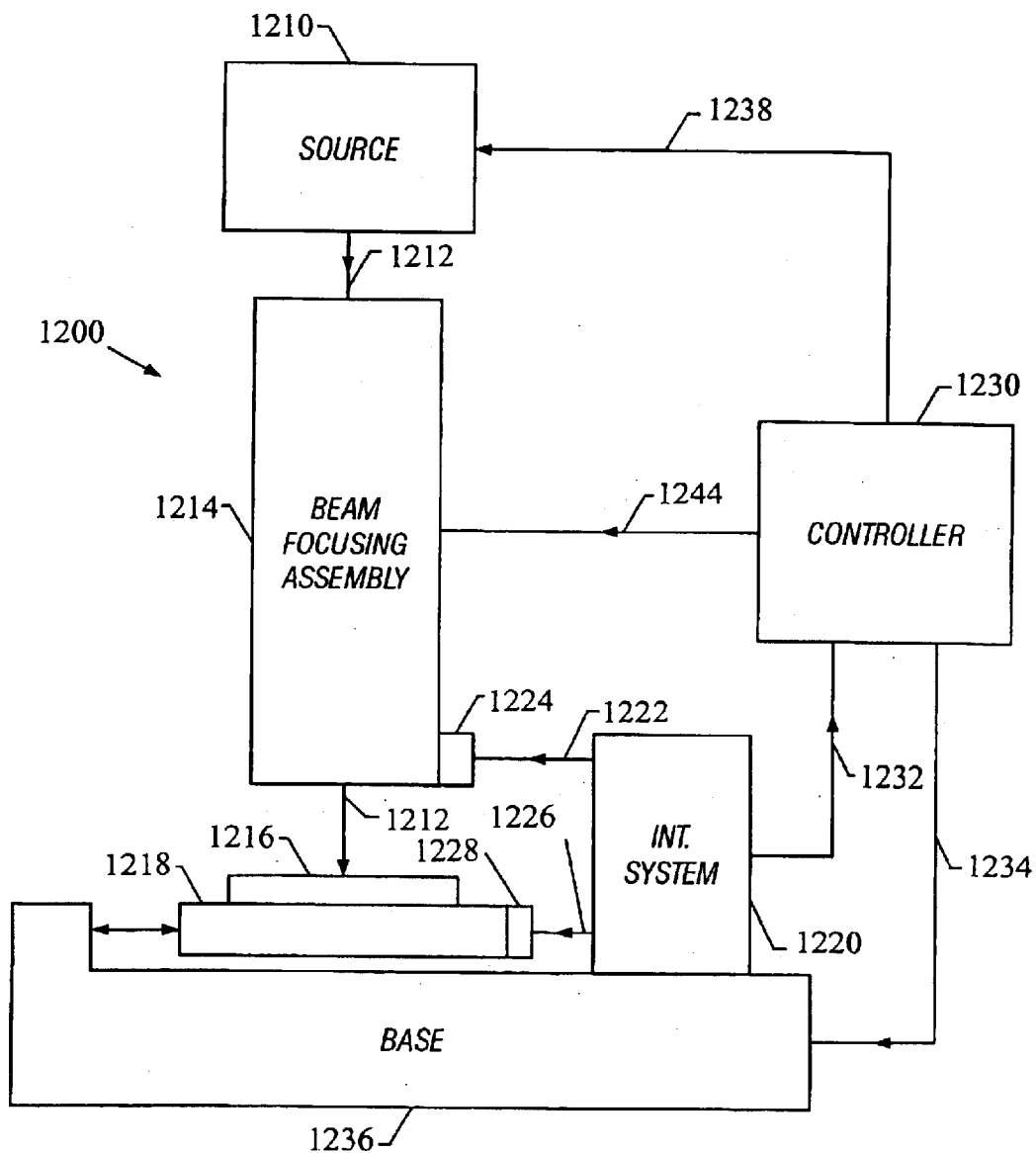
FIG. 9 is a schematic of a beam writing system.

As an example, a schematic of a beam writing system 1200 is shown in FIG. 9. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
 a multiple-pass interferometer including
  reflectors to reflect at least two beams along multiple passes through the interferometer, the multiple passes including a first set of passes and a second set of passes, the reflectors having first alignments that are normal to the directions of the paths of the beams that are reflected by the reflectors,
   the two beams providing information about changes in a first location on one of the reflectors after the first set of passes,
   the two beams providing information about changes in the first location and changes in a second location on the reflector after the second set of passes,
   the paths of the beams being sheared during the first set of passes and during the second set of passes if at least one of the reflectors has an alignment other than the first alignment, and
  optics to redirect the beams after the first set of passes and before the second set of passes so that shear imparted during the second set of passes cancels shear imparted during the first set of passes.

2. The apparatus of claim 1 in which the optics are configured to redirect the beams while maintaining the magnitude and direction of shear between the two beams.

3. The apparatus of claim 1 in which the propagation path of one of the two beams after being redirected by the optics is parallel to the propagation path of the other one of the two beams after completing the first set of passes.

4. The apparatus of claim 1 in which the reflectors comprise plane reflection surfaces.

5. The apparatus of claim 1 in which the beams comprise a reference beam that is directed toward one of the reflectors maintained at a position that is stationary relative to the interferometer.

6. The apparatus of claim 5 in which the beams comprise a measurement beam that is directed towards one of the reflectors that is movable relative to the interferometer.

7. The apparatus of claim 6 in which the paths of the reference and measurement beams define an optical path length difference, the changes in the optical path length difference indicative of changes in the position of the one of the reflectors that is movable relative to the interferometer.

8. The apparatus of claim 1 in which the reflectors comprise a first reflector and a second reflector, the beams comprising a first beam directed toward the first reflector and a second beam directed toward the second reflector, each of the first and second reflectors being movable relative to the interferometer.

9. The apparatus of claim 8 in which the paths of the first and second beams define an optical path length difference, the changes in the optical path length difference indicative of changes in relative positions of the first and second reflectors.

10. The apparatus of claim 1 in which the first set of passes consists of two passes, and during each pass each of the beams is reflected by one of the reflectors at least once.

11. The apparatus of claim 10 in which the second set of passes consists of two passes, and during each pass each of the beams is reflected by one of the reflectors at least once.

12. The apparatus of claim 1 in which the multiple-pass interferometer comprises a beam splitter that separates an input beam into the beams and directs the beams toward the reflectors.

13. The apparatus of claim 12 in which the beam splitter comprises a polarizing beam splitter.

14. The apparatus of claim 1 in which the optics comprise an odd number of reflection surfaces.

15. The apparatus of claim 14 in which normals of the reflection surfaces lie in a common plane.

16. The apparatus of claim 14 in which the reflection surfaces comprise plane reflection surfaces.

17. The apparatus of claim 14 in which for each beam redirected by the optics, the beam is reflected by the reflection surfaces such that a sum of angles between incident and reflection beams of each reflection surface is zero or an integer multiple of 360 degrees, the angle measured in a direction from the incident beam to the reflection beam, the angle having a positive value when measured in a counter clockwise direction and a negative value when measured in a clockwise direction.

18. The apparatus claim 1 in which the interferometer combines the beams after the beams travel through the first and second set of passes to form overlapping beams that exit the interferometer.

19. The apparatus of claim 18, further comprising a detector that responds to optical interference between the overlapping beams and produces an interference signal indicative of an optical path length difference between the paths of the beams.

20. The apparatus of claim 19 in which the detector comprises a photodetector, an amplifier, and an analog-to-digital converter.

21. The apparatus of claim 20, further comprising an analyzer coupled to the detector to estimate a change in an optical path length difference of the beams based on the interference signal.

22. The apparatus of claim 1 in which the optics consist of one reflection surface.

23. The apparatus of claim 1 in which the optics comprise an even number of reflection surfaces.

24. The apparatus of claim 23 in which the optics comprise a cube corner retroreflector.

25. The apparatus of claim 1, further comprising a source to provide the beams.

26. The apparatus of claim 1 in which the interferometer comprises a differential plane mirror interferometer.

27. The apparatus of claim 1 in which the two beams have different frequencies.

28. A lithography system for use in fabricating integrated circuits on a wafer, the system comprising:
 a stage to support the wafer;
 an illumination system to image spatially patterned radiation onto the wafer;
 a positioning system to adjust the position of the stage relative to the imaged radiation; and the apparatus of claim 1 to monitor the position of the stage relative to the imaged radiation.

29. A lithography system for use in fabricating integrated circuits on a wafer, the system comprising:
a stage to support the wafer; and
an illumination system including a radiation source, a mask, a positioning system, a lens assembly, and the apparatus of claim 1;
wherein during operation the source directs radiation through the mask to produce spatially patterned radiation, the positioning system adjusts the position of the mask relative to the radiation from the source, the lens assembly images the spatially patterned radiation onto the wafer, and the interferometer measures the position of the mask relative to the wafer.

30. A lithography system for use in fabricating a lithography mask, the system comprising:
a source to provide a write beam to pattern the lithography mask,
a stage to support the lithography mask,
a beam directing assembly to deliver the write beam to the lithography mask,
a positioning system to position the stage and beam directing assembly relative to one another, and
the apparatus of claim 1 to monitor the position of the stage relative to the beam directing assembly.

31. A method for fabricating integrated circuits, comprising:
using the lithography system of claim 28 to support a wafer, image spatially patterned radiation onto the wafer, adjust the position of the stage relative to the imaged radiation, and use the interferometer to monitor the position of the stage relative to the imaged radiation.

32. A method for fabricating integrated circuits, comprising:
using the lithography system of claim 29 to support a wafer, direct radiation from the source through the mask to produce spatially patterned radiation on the wafer, adjust the position of the mask relative to the radiation from the source, image the spatially patterned radiation onto the wafer, and use the interferometer to monitor the position of the mask relative to the wafer.

33. A method for fabricating lithography masks, comprising:
using the lithography system of claim 30 to support a lithography mask, deliver a write beam to the lithography mask, position the stage and beam directing assembly relative to one another, and use the interferometer to measure the position of the stage relative to the beam directing assembly.

34. A method comprising:
directing a first measurement beam along a first set of passes through an interferometer to a first region on a measurement object;
directing a first reference beam along a first set of passes through the interferometer to a reference object;
combining the first measurement and reference beams to produce a first output beam after the first measurement and reference beams complete the first set of passes;
determining a change in position in the first region on the measurement object;
using optics to direct a portion of the first measurement beam to form a second measurement beam;
using the optics to direct a portion of the first reference beam to form a second reference beam;
directing the second measurement beam along a second set of passes through the interferometer to a second region on the measurement object;
directing the second reference beam along a second set of passes through the interferometer to the reference object;
combining the second measurement and reference beams to produce a second output beam after the second measurement and reference beams complete the second set of passes; and
determining a change in position in the second region on the measurement object;
wherein a rotation of the measurement object relative to the directions of the paths of the first and second measurement beams that are incident on the measurement object imparts beam shear to the first measurement beam during the first set of passes and to the second measurement beam during the second set of passes, and
wherein the optics are configured to redirect the portion of the first measurement and reference output beams so that shear imparted upon the second measurement beam during the second set of passes cancels shear imparted upon the first measurement beam during the first set of passes.

35. A lithography method for use in fabricating integrated circuits on a wafer, the method comprising:
supporting the wafer on a moveable stage;
imaging spatially patterned radiation onto the wafer;
adjusting the position of the stage relative to the imaged radiation; and
monitoring the position of the stage relative to the imaged radiation using the method of claim 34.

36. A lithography method for use in the fabrication of integrated circuits comprising:
directing input radiation through a mask to produce spatially patterned radiation;
positioning the mask relative to the input radiation;
monitoring the position of the mask relative to the input radiation using the method of claim 34; and
imaging the spatially patterned radiation onto a wafer.

37. A lithography method for fabricating integrated circuits on a wafer, the method comprising:
positioning a first component of a lithography system relative to a second component of a lithography system to expose the wafer to spatially patterned radiation; and
monitoring the position of the first component relative to the second component using the method of claim 34.

38. A method for fabricating integrated circuits, the method comprising the lithography method of claim 34.

39. A method for fabricating integrated circuits, the method comprising the lithography method of claim 35.

40. A method for fabricating integrated circuits, the method comprising the lithography method of claim 36.

41. A method for fabricating integrated circuits, the method comprising the lithography method of claim 37.

42. A method for fabricating a lithography mask, the method comprising:
directing a write beam to a substrate to pattern the substrate;
positioning the substrate relative to the write beam; and
monitoring the position of the substrate relative to the write beam using the method of claim 34.

43. An apparatus comprising:

a multi-axis interferometer for measuring changes in position of a measurement object with respect to multiple degrees of freedom, the interferometer is configured to receive an input beam, direct a first-measurement beam derived from the input beam to make first and second passes to the measurement object about a first point on the measurement object, and then combine the first measurement beam with a first reference beam derived from the input beam to produce a first output beam comprising information about changes in distance to the first point on the measurement object, and the interferometer is further configured to direct a second-measurement beam derived from the input beam to make first and second passes to the measurement object about a second point on the measurement object, and then combine the second measurement beam with a second reference beam derived from the input beam to produce a second output beam comprising information about changes in distance to the second point on the measurement object, wherein the interferometer comprises fold optics positioned to reflect a portion of the first output beam an odd number of times in a plane defined by the incidence of the measurement beams on the measurement objects to define a secondary input beam, and wherein the second measurement beam and the second reference beam are derived from the secondary input beam.

44. The apparatus of claim 43 wherein the interferometer comprises a polarizing beam splitter for directing the different beams along their respective paths, a first quarter wave plate positioned between the polarizing beam splitter and a reference object, and a second quarter wave plate positioned between the polarizing beam splitter and the measurement object.

45. The apparatus of claim 44 wherein the reference object comprises a plane mirror oriented substantially normal to the incident beam portions.

46. The apparatus of claim 44 wherein the fold optics comprise a non-polarizing beam splitter positioned to separate a portion of the first output beam to define the secondary input beam and direct it back to the polarizing beam splitter to produce the second measurement beam and the second reference beam.

47. The apparatus of claim 46, wherein the fold optics comprise a plurality of reflective surfaces positioned to direct the secondary input beam from the non-polarizing beam splitter to the polarizing beam splitter, and wherein the non-polarizing beam splitter and the plurality of reflective surfaces reflect the second input beam an odd number of times prior to reaching the polarizing beam splitter.

48. The apparatus of claim 47, wherein the non-polarizing beam splitter reflects the first output beam to produce the secondary input beam, and wherein the plurality of reflective surfaces reflects the secondary input beam an even number of times.

49. The apparatus of claim 43, further comprising a first fiber optic pickup for coupling the first output beam to a detector and a second fiber optic pickup for coupling the second output beam to a detector.

50. A lithography system for use in fabricating integrated circuits on a wafer, the system comprising:

a stage for supporting the wafer;

an illumination system for imaging spatially patterned radiation onto the wafer;

a positioning system for adjusting the position of the stage relative to the imaged radiation; and the apparatus claim 43 for monitoring the position of the wafer relative to the imaged radiation.

51. A lithography system for use in fabricating integrated circuits on a wafer, the system comprising:

a stage for supporting the wafer; and an illumination system including a radiation source, a mask, a positioning system, a lens assembly, and the apparatus of claim 43;

wherein during operation the source directs radiation through the mask to produce spatially patterned radiation, the positioning system adjusts the position of the mask relative to the radiation from the source, the lens assembly images the spatially patterned radiation onto the wafer, and the interferometer monitors the position of the mask relative to the radiation from the source.

52. A beam writing system for use in fabricating a lithography mask, the system comprising:

a source providing a write beam to pattern a substrate;

a stage supporting the substrate;

a beam directing assembly for delivering the write beam to the substrate;

a positioning system for positioning the stage and beam directing assembly relative one another; and the apparatus of claim 43 for monitoring the position of the stage relative to the beam directing assembly.

* * * * *

UNITED STATES PATENT AND TRADEMARK OFFICE
CERTIFICATE OF CORRECTION

PATENT NO. : 6,791,693 B2
DATED : September 14, 2004
INVENTOR(S) : Henry A. Hill It is certified that error appears in the above-identified patent and that said Letters Patent is hereby corrected as shown below:

Title page,
Item [56], References Cited, U.S. PATENT DOCUMENTS, delete "5,575,160 11/1996 Keus" and replace with -- 5,757,160 5/1998 Kreuzer --.

Column 20,
Line 33, insert -- of -- after "apparatus".

Column 24,
Line 21, insert -- of -- after "apparatus".
Line 44, insert -- to -- after "relative".

Signed and Sealed this

Thirtieth Day of August, 2005

JON W. DUDAS
*Director of the United States Patent and Trademark Office*